April 18, 1961 J. BOLSEY 2,979,985
FILM COUNTER AND SPRING TENSION INDICATORS
Filed Oct. 20, 1955 4 Sheets-Sheet 1

INVENTOR:
Jacques Bolsey
BY:
Michael S. Stuker
agt.

April 18, 1961   J. BOLSEY   2,979,985
FILM COUNTER AND SPRING TENSION INDICATORS
Filed Oct. 20, 1955   4 Sheets-Sheet 2

INVENTOR.
Jacques Bolsey
BY:
Michael S. Striker
agt.

April 18, 1961    J. BOLSEY    2,979,985
FILM COUNTER AND SPRING TENSION INDICATORS
Filed Oct. 20, 1955    4 Sheets-Sheet 3

INVENTOR:
Jacques Bolsey
BY:
Michael S. Struker
agt.

April 18, 1961  J. BOLSEY  2,979,985
FILM COUNTER AND SPRING TENSION INDICATORS
Filed Oct. 20, 1955  4 Sheets-Sheet 4

INVENTOR:
Jacques Bolsey
BY:
Michael S. Striker
agt.

United States Patent Office 2,979,985
Patented Apr. 18, 1961

2,979,985

FILM COUNTER AND SPRING TENSION INDICATORS

Jacques Bolsey, New York, N.Y., assignor, by mesne assignments, to Am-Bol Corp., Long Island City, N.Y., a corporation of New York Filed Oct. 20, 1955, Ser. No. 541,761

7 Claims. (Cl. 88—16)

The present invention relates to cinematographic cameras.

More particularly, the present invention relates to indicator appaartus for cinematographic cameras. Thus, the present invention relates to a counter for indicating the length of unexposed film remaining in the camera as well as a device for indicating when a spring motor of the camera requires tensioning.

One of the objects of the present invention is to provide a cinematographic camera with a means for automatically zeroing a counter which indicates the length of unexposed film remaining in the camera.

Another object of the present invention is to provide a zeroing means of this type which automatically acts to zero the counter whenever the film container is removed from the camera.

An additional object of the present invention is to provide an indicator visible in the view finder for indicating the length of unexposed film remaining in the camera.

Still another object of the present invention is to provide an indicator visible in the view finder for indicating when the spring motor of the camera requires tensioning, or how much tension it has.

It is also an object of the present invention to provide structure capable of accomplishing all of the above objects and at the same time characterized by extreme simplicity of construction, reliability in operation, and great compactness.

With the above objects in view, the present invention mainly consists of a cinematographic camera which includes a support means and a view finder carried by the support means. A drive means is carried by the support means for actuating the camera, and this drive means includes a spring motor. A first indicating means is carried by the support means and is operatively connected to the drive means to be operated thereby for indicating the length of unexposed film remaining in the camera. A second indicating means is carried by the support means and is operatively connected to the first indicating means to be actuated thereby for indicating in the view finder approximately the amount of unexposed film remaining in the camera. A third indicating means is also carried by the support means and is operatively connected to the first indicating means to be actuated thereby for indicating in the view finder the extent to which the spring motor is tensioned.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
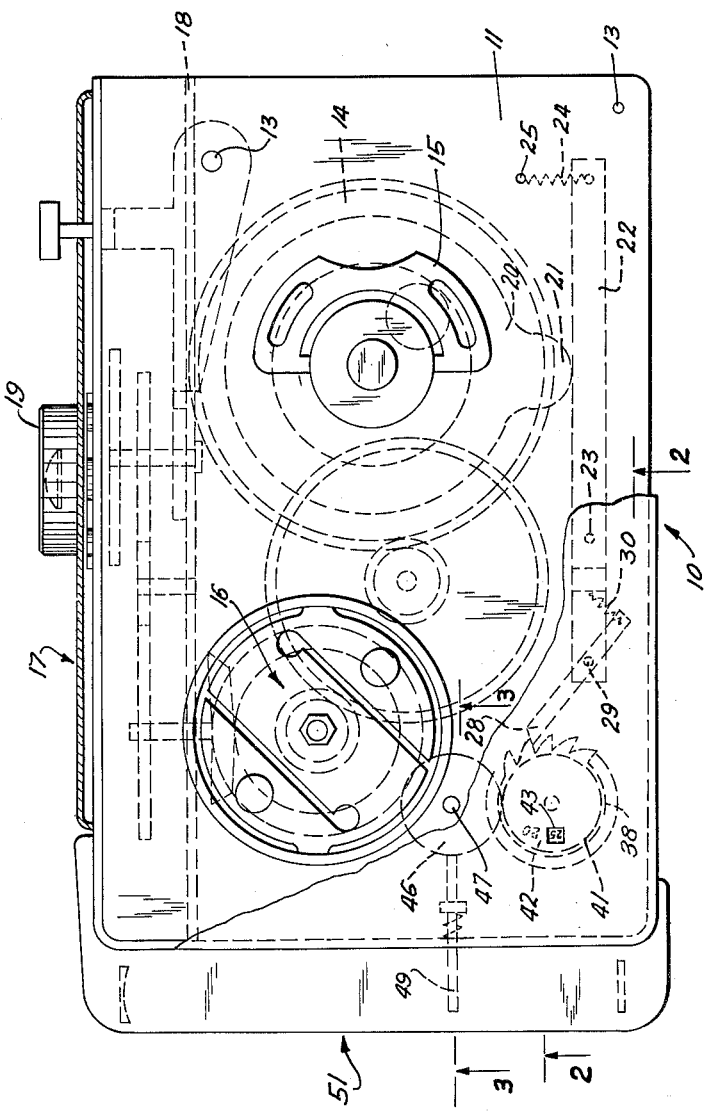
Fig. 1 is a side elevational view of a camera constructed in accordance with the present invention.
Figure 2:
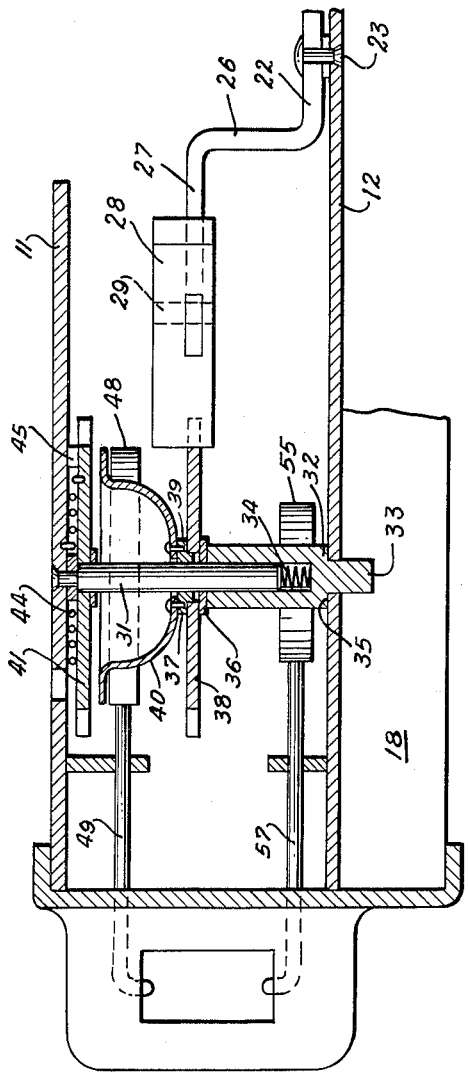
Fig. 2 is a sectional elevational view taken along line 3—3 of Fig. 1 in the direction of the arrows.
Figure 3:
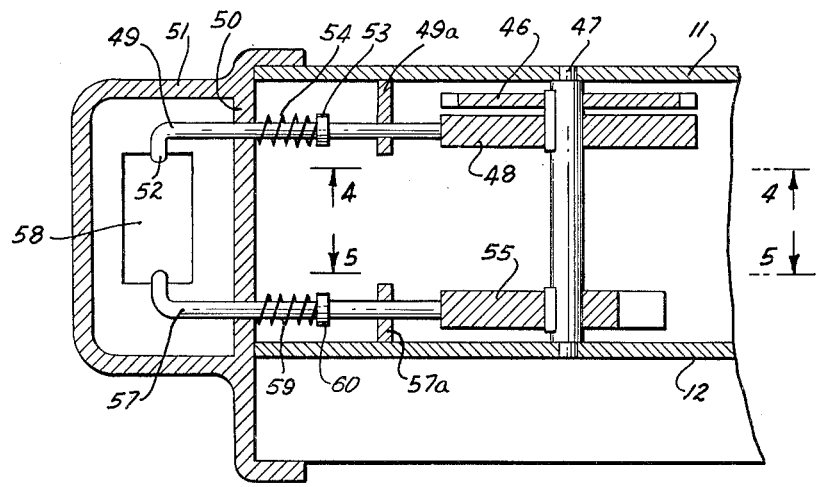

Referring now to the drawings, Fig. 1 shows parts of a cinematographic camera constructed in accordance with the present invention. Thus, Fig. 1 shows a support means which includes a removable casing 10 in which supporting plates carrying the several parts of the camera are located, one of these supporting plates 11 being visible in Fig. 1. A second support plate 12 (Fig. 2) is parallel to and spaced from the plate 11, these plates being held together by any suitable means such as a plurality of pins 13 located adjacent the corners of plates and being partly visible in Fig. 1. Between the plates 11 and 12 is located a spring motor 14 which may be manually wound through a suitable handle 15 which may be turned from a position lying next to the casing 10 to a position substantially normal thereto when it is desired to tension motor 14. The details of the spring motor 14 and the structure for manually winding the same are of no particular pertinence to the present invention, and these parts may have any conventional construction. Fig. 1 shows in dotted lines a gear train for transporting film as well as for operating such members as the shutter and claw of the camera, and these parts also form no part of the present invention and are therefore not described. A governor 16 is provided to control the speed of operation of the camera, and this governor also has no relevance to the present invention. The shutter and claw assemblies as well as part of the gear train for driving the same and the manual control for starting and stopping the camera are located within a compartment 17 of the camera, this compartment being wider than the distance between plates 11 and 12. Figs. 2 and 3 show part of a well 18 which forms the rear wall of this compartment. The objective 19 (Fig. 1) is carried by the front wall of compartment 17, and the magazine is removably located in any suitable way, not forming part of the present invention, within the casing 10 behind the rear wall 18 and against the outer face of the plate 12, this rear wall 18 being formed with the film gate of the camera through which the light rays pass from the objective to the film in the magazine, this magazine not being shown since it forms no part of the present invention and including a take-up spool driven by any suitable transmission from spring motor 14.

A description of the details of the above features is not required to understand the present invention, and therefore, in the interest of conciseness, such as description is not presented.

The spring motor 14 is coaxial with and fixed to a cam 20 which turns together with the spring motor barrel and which includes a camming projection 21 (Fig. 1). A lever 22, shown in Figs. 1 and 2, is turnably carried intermediate its ends by the plate 12 through the medium of a pivot pin 23 fixed to the plate 12 and passing through a bore of the lever 22. The right free end of lever 22, as viewed in Fig. 1, is connected to a spring 24 which is in turn connected to a pin 25 fixed to and extending between walls 11 and 12, so that this spring 24 constantly urges the lever 22 in a counterclockwise direction about pivot pin 23, as viewed in Fig.

1, so that the spring 24 guarantees that the lever 22 remains in engagement with the cam 20 which turns together with the barrel of the spring motor.

As is evident from Fig. 2, the left free end portion of lever 22 includes an arm 26 extending away from plate 12 toward plate 11 and an arm 27 extending between and being substantially parallel to the plates 11 and 12. A pawl 28 is formed with a cut-out into which the extreme end portion of arm 27 of lever 22 freely extends, and a pivot pin 29 extends through this extreme end portion of arm 27 as well as into the pawl 28 to turnably support the latter on the left free end of lever 22, as viewed in Figs. 1 and 2. A spring 30 is fixed at one end to the pawl 28 and at its opposite end to the arm 27 of lever 22, so that this spring 30 urges the pawl 28 in a counter-clockwise direction about the pivot 29, as viewed in Fig. 1.

As is shown most clearly in Fig. 2, the plate 11 carries an elongated shaft 31 which is fixed to this plate 11 and which extends therefrom toward but not up to the plate 12. A second shaft 32 is formed with an axial bore into which the shaft 31 slidably extends, and this shaft 32 has an end portion 33 of reduced diameter extending freely through an opening in plate 12, as shown in Fig. 2, into the space where the magazine of the camera is located. A spring 34 is located within the bore of shaft 32 and engages the latter as well as the end of shaft 31 to urge shaft 32 toward plate 12 until the shoulder 35 of shaft 32 engages the plate 12. A pair of rings 36 and 37 are located freely about the shaft 31 for movement axially along the same, and a ratchet wheel 38 is located between and engages these rings, the ring 37 having a shoulder 39 which engages the inner periphery of ratchet wheel 38 so that the latter cannot shift in its own plane transversely to the axis of shaft 31. As is evident from Fig. 1, the pawl 28 engages the teeth of ratchet wheel 38, and whenever the cam 20 turns lever 22 in a clockwise direction about pivot 23 the pawl 28 turns the ratchet wheel 38 through an angular distance equal to one tooth of the ratchet wheel.

A dished spring 40 is formed with a central aperture through which the shaft 31 freely extends, as shown in Fig. 2, this spring 40 having its outer periphery adjacent one face of a gear 41 whose opposite face is provided with the numbers 42 which indicate the feet of unexposed film remaining in the camera. These numbers are visible through an opening of the plate 11 and an aligned opening 43 of the casing 10. A spiral wire spring 44 is located about shaft 31 between plate 11 and gear 41, and the ends of spring 44 are respectively connected to plate 11 and gear 41, as indicated in Fig. 2. The gear 41 further carries a stop member 45 which engages a similar stop member fixed to the plate 11 when the dial formed by the outer face of gear 41 is zeroed, as will be apparent from the description which follows. Gear 41 is freely turnable on shaft 31 and is positioned axially on the latter by the collars shown in Fig. 2.

In the illustrated example, the camera is designed to carry 25 feet of unexposed film when a fresh load of film is placed in the camera. Thus, the maximum number of the dial is 25, and this is the number which appears in window 43, as shown in Fig. 1, when the above-described counter mechanism is zeroed. The ratchet wheel 38 has 25 teeth and the barrel of the spring motor must make 25 revolutions to expose a full length of film, the cam 20 therefore also making 25 revolutions and reciprocating the lever 22 25 times during the exposure of a full length of film. In this way, the ratchet wheel and gear 41 are turned through one complete revolution during exposure of a full length of film, and during such turning the numbers appearing in the window 43 become progressively smaller.

The gear 41 is not in driving engagement with ratchet wheel 38 in the position of the parts shown in Fig. 2. In this position of the parts the film container is removed from the camera. Gear 41 and ratchet wheel 38 are automatically placed in driving engagement by insertion of a magazine into the camera. This magazine, when it is in its operative position within the camera, engages the outer face of plate 12 and thus pushes the projection 33 toward shaft 31 to shift the entire shaft 32 toward the plate 11 and compresses the spring 34. Such a shifting of shaft 32 also shifts the rings 36 and 37 and the ratchet wheel 38 toward the plate 11 to cause spring 40 to engage gear 41 and to compress the dished spring 40 and thus provide a frictional driving engagement between spring 40 and ratchet wheel 38 and gear 41. It will be noted from Fig. 2 that the pawl 28 is thick enough to remain in engagement with the ratchet wheel 38 when the latter is shifted toward the plate 11. This frictional force of the spring 40 against gear 41, when a film container is in the camera, is superior to the force of spring 44 so that this spring becomes tensioned as the gear 41 turns together with the ratchet wheel 38, and during such turning the stop 45 turns together with gear 41 away from the other stop carried by the plate 11. Thus, the camera is designed to transport one foot of film during each revolution of the barrel of spring motor 14, and the above-described counting mechanism indicates the length of unexposed film remaining in the camera.

When the film container is removed from the camera, the spring 34 returns shaft 32 to the position shown in Fig. 2 and spring 40 is now out of driving engagement with gear 41 and ratchet wheel 38, so that now the tensioned spring 44 turns the gear 41 back to its zero position where the stop 45 engages the stop fixed to the plate 11 and where the number 25 is again visible. It will be noted that this zeroing of the counter is completely automatic and requires no attention of the operator. As soon as the operator removes the film container from the camera the counter becomes automatically zeroed, and of course when a new film container is placed in the camera the counter is automatically rendered ready for operation.

Figure 4:
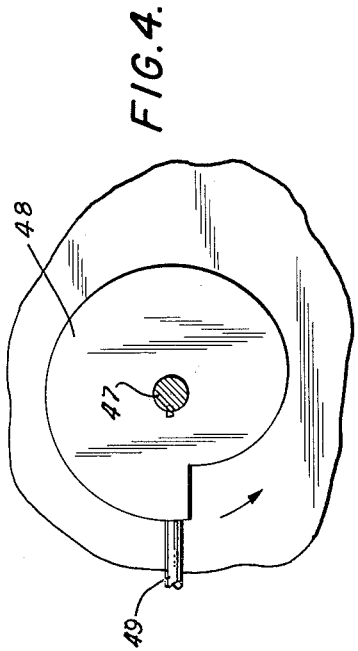
Fig. 4 is a sectional view taken along line 4—4 of Fig. 3 in the direction of the arrows.

Since it is inconvenient for the operator to interrupt use of the camera in order to look at the window 43, an indicator is provided in the view finder to indicate to the operator approximately the amount of unexposed film remaining in the camera. As is shown most clearly in Fig. 1, the gear 41 meshes with a gear 46 which is fixed to a shaft 47 turnably carried by the plates 11 and 12, as is shown most clearly in Fig. 3. Thus, whenever gear 41 turns, the gear 46 turns and the shaft 47 turns therewith. A cam 48 is fixed to the shaft 47 for rotation therewith, the configuration of this cam being shown most clearly in Fig. 4. When the spring motor actuates the pawl and ratchet during operation of the camera, the gear 41 turns in a counterclockwise direction, and the gear 46 simultaneously turns in a clockwise direction, as viewed in Fig. 1, and of course the cam 48 turns in a counterclockwise direction, as viewed in Fig. 4. The cam 48 is shown in Fig. 4 in the position corresponding to the zero position of the camera.

A cam follower 49 has its right end, as viewed in Fig. 3, in engagement with the cam 48, this cam follower 49 being substantially L-shaped as shown in Fig. 3, and being of a non-circular cross section. The follower extends slidably through a fixed bearing 49a and a corresponding opening of non-circular cross section formed in the wall 50 of the casing 10, this wall 50 defining part of the chamber 51 which houses the view finder. Thus, the leg 52 of the follower 49 is movable up and down the view finder, and only the free end of leg 52 extends into the field of vision of the view finder, as indicated in Fig. 3. Because the follower 49 is of non-circular cross section and extends through a mating non-circular opening of wall 50, there is no danger that the follower 49 will turn.

A collar 53 is fixed to the follower 49, and a spring 54 is coiled about follower 49 and abuts against collar 53 and wall 50 to maintain the follower 49 in engagement with cam 48 when the casing 10 is on the camera.

Thus, during operation of the camera, the free end of leg 52 is visible to the operator and the operator knows that when this visible part of the follower 49 is located near the bottom of the field of vision in the view finder the length of unexposed film remaining in the camera is becoming short, and a precise indication may be derived from the window 43.

In order to keep the size of the camera as well as the weight thereof as small as possible, the spring motor 14 is not made of a size large enough to transport the entire length of film when the motor spring is fully tensioned. Thus, for example, the spring motor may be designed to transport only about one third of a full length of film when the spring motor is fully tensioned. For instance, in the illustrated example, the spring motor is capable of turning the barrel through nine revolutions without requiring tensioning. Thus, it is necessary to indicate to the operator the necessity for tensioning the spring motor after only a fraction of the full length of film is exposed.

This result is accomplished in the camera of the invention by fixing to the shaft 47, for rotation therewith, a cam 55 (Fig. 5) having three lobes 56 in the illustrated example, these lobes being angularly spaced from each other by 120 degrees. In the position shown in Fig. 5, the counter is zeroed and the follower 57, which may be identical with the follower 49, except that the free end 58 of follower 57 has a different color or shape than free end 52 of follower 49, is at the crest of one of the lobes. The wall 50 is formed with a second bore identical with that through which follower 49 extends and accommodating the follower 57 for movement toward and away from the shaft 47, a spring 59 and collar 60, identical with spring 54 and collar 53, cooperating with follower 57 to maintain the latter in engagement with the cam 55. It will be noted that the end 58 of follower 57 extends toward the end 52 of follower 49 and is located at the opposite side of the field of vision. A fixed bearing 57a is provided to guide follower 57, as shown in Fig. 3.

Figure 5:
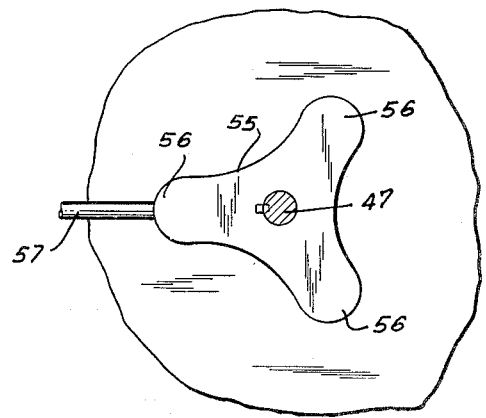
Fig. 5 is a sectional view taken along line 5—5 of Fig. 3 in the direction of the arrows.

Thus, with the disclosed arrangement, the cam 55 turns in a clockwise direction, as viewed in Fig. 5, during turning of the gear 41 and ratchet wheel 38 in a counterclockwise direction, as viewed in Fig. 1. The gear 46 is of the same diameter as the gear 41, and when these gears as well as the cam 55 have turned through approximately one third of a revolution the follower 57 will have descended to the bottom part of the field of vision in the view finder and will have almost again reached the top part of this field of vision as the crest of the next lobe comes into engagement with the follower 57. When the operator sees the free end 58 of follower 57 again approaching the upper part of the field of vision he knows that it is about time to tension the spring motor again. Thus, the follower 57 is moved up and down the field of vision once during each third of a revolution, in the illustrated example, to indicate to the operator that the spring motor requires tensioning.

It will be noted that this indication of the extent to which the spring motor is tensioned does not in any way interfere with the structure for indicating the amount of unexposed film remaining in the camera and operates simultaneously therewith. With the arrangement of the invention the operator can know at any time, from the position of the legs 52 and 58 in the view finder, both the extent to which the spring is tensioned and approximately the length of unexposed film remaining in the camera, the number appearing in window 43 giving a precise indication of the length of unexposed film.

Figure 6:
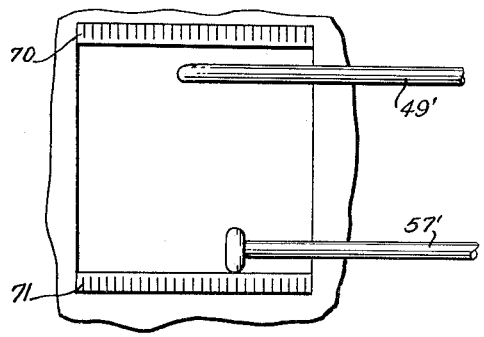
Fig. 6 is a fragmentary view illustrating another embodiment of indicator means.

Fig. 6 shows an embodiment where the indicator members 49′ and 57′ correspond respectively to the indicators 49 and 57 and are operated in the same way. With the embodiment of Fig. 6 these indicators have different configurations and therefore are distinguishable from each other by their different shapes, as is clearly evident from Fig. 6. Furthermore, the view finder window which is shown in Fig. 6 is provided with a pair of scales 70 and 71 respectively cooperating with the indicator member 49′ and 57′. Of course, similar scales may be included in the embodiment of Fig. 3.

Figure 7:
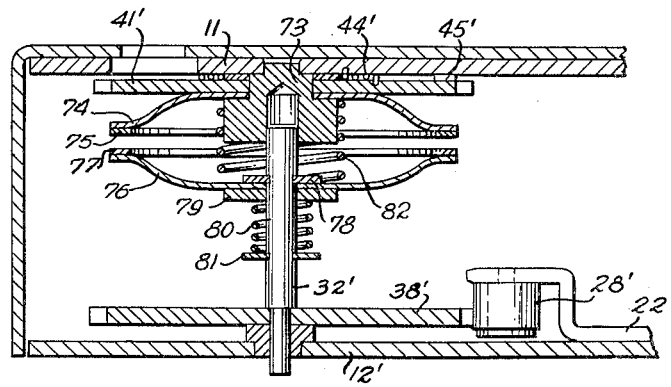
Fig. 7 is a partly sectional fragmentary elevational view illustrating another embodiment of a structure for operating the counterwheel.

According to the embodiment of the invention which is shown in Fig. 7, the wall 12′ which corresponds to the wall 12 is formed with an opening through which a reduced end portion of the shaft 32′ extends, shaft 32′ corresponding to shaft 32. With the embodiment of Fig. 7 the shaft 32′ extends at an end portion thereof slidably into a bore of a member 73 fixed to the wall 11 of the camera. Thus, the member 73 guides the shaft 32′ for axial movement, and it is evident that when a film container is placed in the camera this film container will press against the lower end of the shaft 32′, as viewed in Fig. 7, to shift this shaft 32′ axially toward the member 73. The gear 41′, shown in Fig. 7, which corresponds in all respects to the gear 41 is freely turnable on a shoulder of the member 73, as shown in Fig. 7, and a spring 44′ corresponding in all respects to the spring 44 cooperates with the gear 41 in the same way that spring 44 cooperates with the gear 41 of Fig. 2. A stop 45′ is also provided with the embodiment of Fig. 7 in the same way as with the embodiment of Fig. 2.

A dished spring member 74 is fixed to the gear 41′ for turning movement therewith through rivets or the like, the dished member 74 being coaxial with the gear 41′. At its lower peripheral face, as viewed in Fig. 7, the dished spring member 74 carries a ring 75 of a friction material.

The shaft 32′ extends freely through an opening of a springy dished member 76 which is a mirror image of the springy member 74, the springy dished member 76 being provided with a friction ring 77 which is located opposite and cooperates with the friction ring 75, ring 77 being fixed to the springy member 76. The parts 74 and 76 are of the same diameter, and rings 75 and 77 are also of the same diameter. The springy member 76 is located between a collar 78 fixed to the shaft 32′ and a washer 79 freely slidable along the shaft 72′ and urged toward the collar 78 by spring 80 coiled about the shaft 32′, engaging with one end the washer 79, and engaging with its opposite end a collar 81 fixed to the shaft 32′, as is shown in Fig. 7. Thus, the spring 80 provides frictional driving engagement between collar 78 and springy member 76, so that when the shaft 32′ is turned the springy member 76 will turn with it.

A spring 82, of a larger diameter than spring 80, is coaxial with the latter and is located between the springy members 74 and 76 to urge the latter apart from each other. The spring 82, therefore, urges the parts to the rest position shown in Fig. 7.

As is also shown in Fig. 7, a lever 22′ corresponding to the lever 22 of Fig. 2 is actuated in the same way by the spring motor of the camera and pivotally carries a pawl 28′ which engages the teeth of the ratchet wheel 38′ shown in Fig. 7, this ratchet wheel being fixed to the shaft 32′ so that when the ratchet wheel is turned during operation of the lever 22′, the shaft 32′ turns and the springy member 76 also turns. The pawl 28′ is maintained in engagement with the teeth of the ratchet wheel 38′ with a spring similar to the spring 30 described above, and furthermore, as is evident from Fig. 7, the pawl 28′ has a thickness which maintains this pawl in engagement with the ratchet wheel 38′ when the latter is shifted together with the shaft 32′ to its operating position.

It is believed to be evident that the above described structure of Fig. 7 will produce the same results as the above described structure of Fig. 2. When a film container is placed in the camera, the container itself will engage the shaft 32' to urge the latter upwardly, as viewed in Fig. 7, and as a result the friction rings 75 and 77 will engage each other so that the springy member 74 will turn with the springy member 76. The frictional engagement between the springy members 74 and 76 is greater than the force of the spring 44', so that the latter is tensioned as the springy members turn together with the gear 41' during operation of the camera. As soon as the film container is removed from the camera, the spring 82 returns the part to the position shown in Fig. 7, and the driving engagement between elements 74 and 76 is broken so that the spring 44' is now free to return the gear 41' to its zero position where the number 25 is visible through the wall of the camera, as was described above, the stop member 45' cooperating with another stop member fixed to the camera wall 11, as was described above, in order to determine the zero position of the counter.

In the above described embodiments of Figs. 2 and 7, it will be noted that the drive is transmitted to the counter discs as well as to the indicators through a friction clutch which is engaged and disengaged by insertion of the film container into and removal of the film container from the camera, respectively. Such a friction clutch is necessary in order to protect the camera in the event that through carelessness the drive to the counter disc is continued after it has turned through a complete revolution and the stops 45 or 45' engage the other stops fixed respectively to the walls 11 or 11'. Thus, with these friction clutches even though through carelessness the indicators as well as the indicator disc reach the end of their travel, the apparatus will not be injured should the drive continue, the friction clutch slipping at such time.

Figure 8:
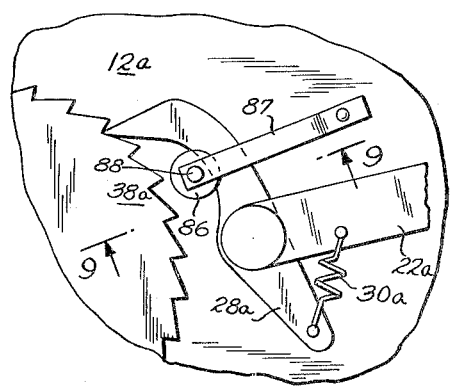
Fig. 8 is a fragmentary plan view of part of another embodiment of the present invention.
Figure 9:
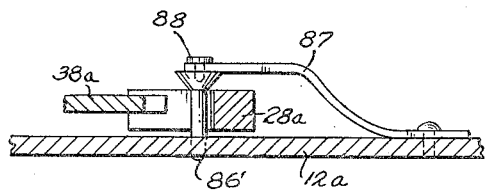
Fig. 9 is a fragmentary sectional elevational view taken along line 9—9 of Fig. 8 in the direction of the arrows.

With the embodiment of Figs. 8 and 9 a friction clutch is also employed in order to protect the parts in the above described manner, but with this embodiment of the invention it is unnecessary to engage and disengage the clutch. Thus, with the embodiment of Figs. 8 and 9 the friction clutch is always engaged and instead the disconnection of the drive is made in a different manner. The friction clutch used with the embodiment of Figs. 8 and 9 can therefore be any conventional friction clutch which is always in its engaged position.

According to the embodiment of Figs. 8 and 9 the pawl 28a, which corresponds to the pawls 28 and 28' described above is pivotally carried by the lever 22a which corresponds in all respects to the levers 22 and 22' described above and operates in the same way to actuate the pawl 28a in order to turn the ratchet wheel 38a which also corresponds in all respects to the above described ratchet wheels. A spring 30a, corresponding to the spring 30, is connected to the lever 22a and the pawl 28a to maintain the latter pawl in operative engagement with the ratchet wheel 38a. Thus, with the structure of Figs. 8 and 9 as thus far described the drive will be transmitted in the same way to the ratchet wheel in order to actuate the indicator mechanisms described above, but there is no structure for disengaging the friction clutch. With the embodiment of Figs. 8 and 9 a pawl disengaging pin 86 is provided to shift the pawl 28a out of engagement with the ratchet wheel 38a whenever a film container is removed from the camera. Thus, it will be seen that the wall 12a of the camera, which corresponds to the above described walls 12 and 12', is formed with a bore through which a portion 86' of the pawl disengaging pin 86 slidably extends into the compartment where the film container is located. This pin 86 has a conical portion which is adapted to engage the pawl 28a. A rivet 88 or the like is fixed to the pin 86 and connects to the latter one end of a leaf spring 87 whose opposite end is fixed to the wall 12a, and it is evident from Fig. 9 that the leaf spring 87 urges the pawl disengaging pin 86 downwardly, as viewed in Fig. 9, so that the conical portion of the pin 86 may engage the pawl 28a to turn the latter in a clockwise direction, as viewed in Fig. 8, against the influence of the spring 30a to a position where the pawl 28a no longer engages the ratchet wheel 38a in order to interrupt the drive from the spring motor to the indicator device.

It is believed to be evident that when a film container is placed within the camera the film container itself will engage the bottom end of the pin 86, as viewed in Fig. 9, to urge this pin to the position shown in Fig. 9 where it is out of engagement with the pawl 28a, so that the spring 30a may maintain the pawl in operative engagement with the ratchet wheel 38a. When the film container is removed from the camera, the spring 87 urges the pin 86 downwardly from the position shown in Fig. 9 so that the conical portion of the pin 86 engages the pawl to move the latter to an inoperative position where it can no longer turn the wheel 38a, the latter wheel and the shaft carrying the same now turning to the zero position with the entire friction clutch under the action of spring 44 or 44'.

Thus, with the embodiment of Figs. 8 and 9 the friction clutch is not disengaged and remains in constant operative position. Instead, the pawl is disengaged from the ratchet wheel.

It will be understood that each of the elements described above, or two or more together, may also find a useful application in other types of cameras differing from the types described above.

While the invention has been illustrated and described as embodied in indicator apparatus for cinematographic cameras, it is not intended to be limited to the details shown, since various modifications and structural changes may be made without departing in any way from the spirit of the present invention as defined in the appended claims.

What is claimed as new and desired to be secured by Letters Patent is:

1. In a cinematographic apparatus, in combination, support means; drive means carried by said support means; indicating means for indicating the length of unexposed film remaining in the camera, said indicating means being carried by said support means and operatively connected to said drive means to be driven thereby from a given starting position, when all of the film in the camera is unexposed, toward an end position indicating that all of the film in the camera has been exposed; and means operatively connected to said indicating means for automatically returning the same to said starting position thereof when film is removed from the camera, said means including a pin member movably mounted on said support means for movement between an extended position in which the free end of said pin member extends into the chamber of the camera where a film container is adapted to be located and in which said pin member disconnects said drive means from said indicating means and a retracted position in which said indicating means is connected to the drive means by means of said pin member, first spring means operatively connected to said pin member and tending to move said pin member to said extended position, and second spring means operatively connected to said indicating means and tending to move said indicating means to said starting position, whereby when a film container is placed in the camera said pin member is moved against the force of said first spring means to said retracted position so that said indicating means is connected to said drive means to be driven thereby and whereby when the film container is removed from the camera said pin member is automatically moved by said first spring means to said extended position so that the indicating means is disconnected from the drive means and said indicating means is moved by said second spring means to said starting position.

2. In a cinematographic apparatus, in combination, support means; a shaft fixed to said support means; a dial turnable on said shaft and at least partly visible from the exterior of the camera; a ratchet wheel also turnable on said shaft and spaced axially from said dial; an annular dish spring extending freely about said shaft between said dial and ratchet wheel and located adjacent the latter so that when said ratchet wheel is moved toward said dial said spring engages the latter and said wheel with a force of friction sufficient to turn said dial together with said ratchet wheel; an actuator slidable axially along said shaft and extending into a chamber of the camera where a film container is adapted to be located so that the film container will engage said actuator to move the latter and said ratchet wheel toward said dial so as to compress said dish spring and place said dial and ratchet wheel in driving frictional engagement with each other; spring means operatively connected to said dial to be tensioned during turning of said dial together with said ratchet wheel; and stop means limiting the turning movement of said dial by said spring means when a film container is removed from the camera to release the frictional driving engagement between the dial and ratchet wheel.

3. In a cinematographic apparatus, in combination, a camera housing; partition means in said camera housing dividing the same into a mechanism compartment and a film compartment adapted to receive a film container; a film transporting mechanism mounted in said mechanism compartment; a dial mounted in said camera housing and at least partly visible from the exterior of the camera; drive means mounted in said camera housing and connecting said film transporting mechanism with said dial for turning the latter during operation of said film transporting mechanism; coupling means forming part of said drive means and movable between a coupling position and an uncoupling position; actuating means for moving said coupling means from said uncoupling to said coupling position and including a movable actuating member projecting in inoperative position through said partition means into the space intended for the film container and being moved by insertion of a film container into said film compartment into an operative position moving said coupling means into the coupling position thereof, so that said dial is connected by said drive means with said film transporting mechanism only while a film container is in said film compartment; and means in said camera housing operatively connected to said dial for automatically returning the same to its starting position when said coupling means is in uncoupling position.

4. In a cinematographic apparatus, in combination, a camera housing; partition means in said camera housing dividing the same into a mechanism compartment and a film compartment adapted to receive a film container; a film transporting mechanism mounted in said mechanism compartment; a dial mounted in said camera housing and at least partly visible from the exterior of the camera; drive means mounted in said camera housing and connecting said film transporting mechanism with said dial for turning the latter during operation of said film transporting mechanism; coupling means forming part of said drive means and movable between a coupling position and an uncoupling position; spring means operatively connected to said coupling means and tending to keep the same in uncoupling position; actuating means for moving said coupling means against the force of said spring means from said uncoupling to said coupling position and including a movable actuating member projecting in inoperative position through said partition means into the space intended for the film container and being moved by insertion of a film container into said film compartment into an operative position moving said coupling means into the coupling position thereof, so that said dial is connected by said drive means with said film transporting mechanism only while a film container is in said film compartment; and means in said camera housing operatively connected to said dial for automatically returning the same to its starting position when said coupling means is in uncoupling position.

5. In a cinematographic apparatus, in combination, a camera housing; partition means in said camera housing dividing the same into a mechanism compartment and a film compartment adapted to receive a film container; a film transporting mechanism mounted in said mechanism compartment; a dial mounted in said camera housing and at least partly visible from the exterior of the camera; drive means including a pawl and ratchet mechanism mounted in said camera housing and connecting said film transporting mechanism with said dial for turning the latter during operation of said film transporting mechanism; coupling means forming part of said drive means and movable between a coupling position and an uncoupling position, said coupling means engaging said pawl of said pawl and ratchet mechanism of said drive means and moving when in uncoupling position said pawl out of engagement with said ratchet; actuating means for moving said coupling means from said uncoupling to said coupling position and including a movable actuating member projecting in inoperative position through said partition means into the space intended for the film container and being moved by insertion of a film container into said film compartment into an operative position moving said coupling means into the coupling position thereof and permitting said pawl to engage said ratchet, so that said dial is connected by said drive means with said film transporting mechanism only while a film container is in said film compartment; and means in said camera housing operatively connected to said dial for automatically returning the same to its starting position when said coupling means is in uncoupling position.

6. In a cinematographic camera, in combination, a wall defining with one of its faces part of a magazine chamber in which a magazine may be located in close proximity to said wall, the latter being formed with an opening passing therethrough; a pin extending through said opening into said chamber; spring means cooperating with said pin at the side of said wall opposite from said chamber for urging said pin into the space occupied by a magazine when said chamber is empty so that the magazine itself when placed in said chamber will move said pin in opposition to said spring means; an indicator; and drive means for driving said indicator, said drive means including a friction clutch at least part of which is connected to said pin for movement therewith to an engaged position when a magazine is in said chamber and to a disengaged position when said chamber is empty, said drive means cooperating with said pin to be rendered operative thereby only when said pin has been moved in opposition to said spring means by a magazine and to be rendered inoperative when said chamber is empty and said spring means has moved said pin into the space occupied by the magazine, whereby said indicator will be driven by said drive means only when a magazine is in said chamber.

7. In a cinematographic camera, in combination, a wall defining with one of its faces part of a magazine chamber in which a magazine may be located in close proximity to said wall, the latter being formed with an opening passing therethrough; a pin extending through said opening into said chamber; spring means cooperating with said pin at the side of said wall opposite from said chamber for urging said pin into the space occupied by a magazine when said chamber is empty so that the magazine itself when placed in said chamber will move said pin in opposition to said spring means; an indicator; and drive means for driving said indicator, said drve means including a pawl and ratchet and a spring urging said pawl into engagement with said ratchet, said pin moving said pawl to a position out of engagement with said ratchet when a magazine is removed from said chamber and said pin is moved into the space occupied by the magazine by said spring means and said pin releasing said pawl for movement into engagement with said ratchet when a magazine is moved into said space, said drive means cooperating with said pin to be rendered operative thereby only when said pin has been moved in opposition to said spring means by a magazine and to be rendered inoperative when said chamber is empty and said spring means has moved said pin into the space occupied by the magazine, whereby said indicator will be driven by said drive means only when a magazine is in said chamber.

References Cited in the file of this patent

UNITED STATES PATENTS

| | | |
|---|---|---|
| 1,683,314 | Stinchfield | Sept. 4, 1928 |
| 1,858,792 | Merle | May 17, 1932 |
| 2,026,960 | Branch | Jan. 7, 1936 |
| 2,238,482 | Wittel | Apr. 15, 1941 |
| 2,357,146 | Stechbart | Aug. 29, 1944 |
| 2,585,451 | Frankel | Feb. 12, 1952 |
| 2,656,816 | Favre | Oct. 27, 1953 |
| 2,917,981 | Sewig | Dec. 22, 1959 |

FOREIGN PATENTS

| | | |
|---|---|---|
| 656,760 | Germany | Feb. 15, 1938 |
| 730,605 | Germany | Jan. 14, 1943 |
| 884,601 | Germany | July 27, 1953 |